(12) United States Patent
Mathews et al.

(10) Patent No.: US 7,058,472 B2
(45) Date of Patent: *Jun. 6, 2006

(54) METHOD AND SYSTEM FOR COMPUTER AIDED MANUFACTURING

(75) Inventors: Charles Duncan Barrington Mathews, Encino, CA (US); Michael Alan Gustafson, Ventura, CA (US)

(73) Assignee: DP Technology Corp., Camarillo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/016,187

(22) Filed: Dec. 17, 2004

(65) Prior Publication Data

US 2005/0113962 A1 May 26, 2005

Related U.S. Application Data

(63) Continuation of application No. 10/346,473, filed on Jan. 17, 2003, which is a continuation of application No. 10/346,475, filed on Jan. 17, 2003.

(51) Int. Cl.
*G06F 19/00* (2006.01)

(52) U.S. Cl. .................. 700/182; 700/97; 700/103; 700/173

(58) Field of Classification Search ............. 700/97, 700/103, 107, 180, 182
See application file for complete search history.

(56) References Cited

U.S. PATENT DOCUMENTS

| | | | |
|---|---|---|---|
| 4,947,095 A | 8/1990 | Kawamura et al. |
| 5,293,479 A | 3/1994 | Quintero et al. |
| 5,822,207 A | 10/1998 | Hazama et al. |
| 6,112,133 A | 8/2000 | Fishman |
| 6,263,252 B1 | 7/2001 | St. Ville |
| 6,272,396 B1 | 8/2001 | Taitler |
| 6,341,261 B1 | 1/2002 | Vasey-Glandon et al. |
| 6,363,298 B1 | 3/2002 | Shin et al. |
| 6,397,122 B1 | 5/2002 | Lindstrom et al. |
| 6,477,517 B1 | 11/2002 | Limaiem et al. |
| 6,490,498 B1 | 12/2002 | Takagi |
| 6,505,205 B1 | 1/2003 | Kothuri et al. |
| 6,556,886 B1 | 4/2003 | Riva et al. |
| 6,591,156 B1 | 7/2003 | Fukaya et al. |
| 6,647,305 B1 | 11/2003 | Bigelow |
| 6,662,172 B1 | 12/2003 | Smith |

(Continued)

FOREIGN PATENT DOCUMENTS

GB  2 271 004  3/1994

OTHER PUBLICATIONS

U.S. Appl. No. 10/346,475, filed Jan. 17, 2003, Matthews et al.

(Continued)

*Primary Examiner*—Leo Picard
*Assistant Examiner*—Douglas S. Lee
(74) *Attorney, Agent, or Firm*—Alston & Bird LLP

(57) ABSTRACT

A system and method is disclosed for centralizing knowledge and improving programming for manufacturing a part. An embodiment includes a method for manufacturing the part. First, a model of the part is received. Next, a predetermined rule is retrieved from a computer readable medium having a plurality of predetermined rules. A feature of the geometric model is selected by evaluating the retrieved predetermined rule and a process is determined that is associated with the feature. Based on the process, computer code is generated to manufacture the part on a computer controlled machine.

34 Claims, 14 Drawing Sheets

U.S. PATENT DOCUMENTS

| | | | |
|---|---|---|---|
| 6,904,394 | B1 | 6/2005 | Jaffrey |
| 6,907,313 | B1 | 6/2005 | Matthews et al. |
| 2002/0004761 | A1 | 1/2002 | Sekitani |
| 2002/0010523 | A1* | 1/2002 | Gerken et al. ............... 700/97 |
| 2002/0152000 | A1* | 10/2002 | Landers et al. .............. 700/98 |
| 2003/0050726 | A1* | 3/2003 | Jaffrey ....................... 700/182 |
| 2004/0143717 | A1 | 7/2004 | Cantrill |

OTHER PUBLICATIONS

Zalinsky, Peter, CNC Hole Making Without a Programmer, Modern Machine Shop, Jun. 2000, p. 2, first full paragraph.

PartMaker Version 2.3 User Guide, IMCS, Inc., 1997, pp. 42-43, 57-107, 128-129, and 157-162.

Jainfei, Xu, et al., Product-Based Model Representation for Integrating 3D CAD with Computer Simulation, Proceedings of the 1999 Winter Simulation Conference, pp. 971-977.

DP Technology, brochure, ESPRIT: The Right Choice, 2001, 4 pps.

John Martin, "Write Your Own Software," Machine Shop Guide, Jun. 2001, 1 pp.

"CNC System that Reads Solid Geometry Cuts Programming Time 50%," American Machinist, Nov. 2000, 2 pp.

"From 15 Hours to 15 Minutes," Manufacturing Engineering, Nov. 2001, 2 pp.

"CAM System that Supports Four-Axis Turning Saves Up to 833," Modern Medicine Shop, Jul. 2001, 3 pps.

DP Technology Corp.; Product Overview (brochure), May 2002, 4 pp.; USA.

DP Technology Corp.; ESPIRIT Solid Mill (brochure), Oct. 2000, 4 pp, USA.

DP Technology Corp.; ESPIRIT Solid Turn (brochure), Feb. 2001, 4 pp, USA.

DP Technology Corp.; ESPIRIT Solid Wire (brochure), Feb. 2001, 4 pp, USA.

Chuck Matthews, "Unlocking Step-NC's Potential," Machine Design, Oct. 24, 2002, pp. 119.

Al Dean, "ProCaM II Cost-effective Intellegen Machining," Mar. 2002, http://www.cadserves.co.uk/common/viewer/archive/2002/Mar/22/feature9.phtm.

Alan Christman, NC Market Assessment Report, version 11, May 2002, CIMdata, Inc., USA, pp. 81-84, 88-89.

"CAM System Shaves Time Off Programming Four-Axis Turning Operation," Modern Machine Shop; Jul. 2001; pp. 130-321; 134.

D.H. Brown Associates, "knowledge-Based Engineering Systems: Applying Discipline and Technology for Competitive Advantage," Modern Machine Shop, Jun. 1, 2000, Feature Article (Online Supplement) http://www.mmsonline.com/aritices/0600sup.html.

Mark Albert, "Feature Recognition—The Missing Link to Automated CAM," Modern Machine Shop, Apr. 2001.

Mark Albert, "Getting to Know Knowledge-Based Machining," Modern Machine Shop, Nov. 2002, pp. 64-74.

Mark Albert, "Plugging Into STEP NC," Modern Machine Shop, Jul. 2002, pp. 80-85.

Mark Albert, "Strategy-Based Machining," Modern Machine Shop, Feb., 2003, pp. 54-55.

"Mold Toward Complete, Automated CAD/CAM Solutions," Modern Machine Shop, Sep. 2002.

Tom Beard, "The Software Around the Machine," Modern Machine Shop, Dec., 2002, pp. 58-59.

"CAM System Cuts Progamming Time," *Manufacturing Engineering*, Nov., 2001, pp. 32-34.

JI et al., "Machine Interpretation of CAD Data for Manufacturing Applications," *ACM Computing Surveys,* vol. 24, No. 3, Sep. 1997, pp. 264-311.

"Moving Toward Complete, Automated CAD/CAM Solutions," Modern Machine Shop, Sep. 2002.

International Search Report from PCT/US03/41376 dated Sep. 27, 2004.

International Search Report from PCT/US03/41238 dated Sep. 9, 2004.

* cited by examiner

METHOD AND SYSTEM FOR COMPUTER AIDED MANUFACTURING

CROSS REFERENCES

This application is a continuation of U.S. application Ser. No. 10/346,473, filed Jan. 17, 2003, which is copending with and incorporates by reference in its entirety U.S. Utility patent application Ser. No. 10/346,475 titled "Rule-based System and Method for Machining a Part" by Charles D. B. Matthews, et al., filed Jan. 17, 2003.

FIELD OF THE INVENTION

The invention relates generally to the field of computer aided design and computer aided manufacturing (CAD/CAM) and in particular to manufacturing a part using one or more computer controlled machines.

BACKGROUND OF THE INVENTION

The use of a computer controlled machines to automatically machine parts has allowed the quick production of precise parts. For the specific case of machining parts, these machines are called computer numerically controlled (CNC) machines and are basically a computerized machinist that cuts material away from a block of material, e.g., metal or plastic, until the desired product is achieved. For example, a three-axis CNC milling machine has a cutting tool, an end mill, and allows for movement of the tool in three directions, X, Y, and Z. By moving the tool (or the part) and by spinning the end mill, material is removed from the block of material. The CNC machine has its own programming language which includes G and M codes.

In order to make programming a CNC machine more user friendly than writing many cryptic programming lines having G/M codes, a computer aided manufacturing (CAM) front end software tool is typically used. The CAM software tool has a graphical user interface (GUI) and may use a higher level language, such as Microsoft Visual Basic for Applications (VBA), the industry standard macro and scripting language, for programming. The CAM software then automatically generates the appropriate program, including the G/M codes, to run the CNC machine to manufacture the part. The CAM software tool is typically used by a manufacturing engineer.

FIG. 1 is a diagram of an exemplary process of manufacturing a part of the prior art. The manufacturer's process 110 begins in the design section 112 of a company where the part is designed on a computer aided design (CAD) system 114 by the design engineer. The CAD design is stored in a database (DB) 116. The CAD design represents the finished product and is "what" is manufactured. The CAD design, in the form of a geometric model or 2D/3D representation of the finished part, is then electronically transferred to the manufacturing section 120. The CAD model alone normally has insufficient information to manufacture the part, and the manufacturing engineer must add information, such as tool selection and machining parameters, into the CAM tool in order to specify "how" the part is to be machined. The CAM tool may display a solid or 3D surface model of the part, hence allowing the manufacturing engineer full visualization of the finished machined part. The CAM model is stored in DB 124. A program, for example, in VBA and Visual Basic (VB), is written by the manufacturing engineer in order to machine the part from a block of material. The CAM tool significantly reduces the complexity and time needed to write the VB/VBA program. When the programming is finished and debugged, the CAM tool automatically generates the CNC program. The CNC program, including the G-Code, is sent to the shop floor 130 to be executed on the CNC machine 132.

The manufacturing process of FIG. 1 has several problems. First, the process has a one-way flow of information, i.e., from design 112 to manufacture 120 to shop 130. For example, if the machinist on the shop floor needs to modify the CNC program to improve machining the part, this knowledge will normally not get back to either the manufacturing engineer or the design engineer. Similarly, any changes by the manufacturing engineer that could affect the design process are stored only in manufacturing DB 124. The design engineer typically has no access to DB 124, and even if the design engineer had access, the data representation of the CAD model in DB 116 is normally significantly different than the CAM model in DB 124. Thus lack of feedback information significantly impedes improvement of the overall machining process.

Another major problem is that if a feature or attribute in a part changes the manufacturing engineer needs to create another CNC program. VBA somewhat reduces this problem, by automating the programming of different versions of a standard part by using a macro. For example, a VBA macro can be written that characterizes a hole (a feature of a part), using attributes such as diameter, depth, XYZ location. The macro is complied and executed. The user is asked to enter values for the attributes or to make a selection among several predetermined choices. The macro takes these values, creates circles representing the holes, selects the cutting tools, automatically creates the drilling operations, and produces the G code program. The CNC machine inputs the G code program and machines the hole in the part. However, for example, if one feature is different in a similar part, e.g., a threaded hole rather than a counter bored hole, then a new VBA macro is typically written by the manufacturing engineer. Thus the conventional macro only increases program flexibility in a limited way by allowing different values for fixed attributes, but does not allow, for example, the addition/removal of features and attributes or the selection of a different manufacturing process.

In addition as the programmer is human, two programs, each written by a different person, but machining the same part, are probably different. This "personalized" methodology prevents the standardization of the part manufacturing process.

Therefore there is need for an improved process of machining a part were the design section, manufacturing section, and shop floor can exchange knowledge and were the programming methodology is more flexible, efficient and standardized.

SUMMARY OF THE INVENTION

The present invention includes a system and method for centralizing knowledge and improving programming for manufacturing a part. An exemplary embodiment includes a first program that generates a second program based on one or more rules. The rules relate to one or more features and attributes of a part. The second program has the G code for the CNC machine. While the example of machining of a part using a CNC machine is used to describe some embodiments of the present invention, the scope of the invention is not so limited. The manufacture of any part using a computer controlled machine, for example, the forging of a part or assembly of a part, using one or more programmable computer controlled machines, is also within the scope of the present invention.

An embodiment of the present invention includes a method, using a computer system, for manufacturing a part. First, a model, e.g., a geometric model, of the part is received. Next, a predetermined rule is retrieved from a computer readable medium having a plurality of predetermined rules. A feature of the model is selected by evaluating the retrieved predetermined rule and a process is determined that is associated with the feature. Based on the process, computer code is generated to manufacture the part on a computer controlled machine.

Another embodiment of the present invention includes a method for manufacturing a part using a computer system. First, a model of the part is received. Next, a feature of the model is selected from a plurality of features by evaluating a first predetermined rule. An attribute is then selected from a plurality of attributes associated with the feature by evaluating a second predetermined rule. The attribute describes a physical characteristic of the feature, and the second predetermined rule includes a fragment of code stored in a computer readable medium.

A further embodiment of the present invention includes a system for manufacturing a part using a first program stored in a computer readable medium. The system includes: a database having a plurality of machining operations and a plurality of rules; and a second program stored in memory, where the second program is operably configured to select a set of machining operations from the plurality of machining operations by evaluating the plurality of rules. The set is used to create a portion of the first program.

An aspect of the present invention includes computer system for machining a feature of a part. The computer system includes a processor, a user input device coupled to the processor, and a display coupled to the processor. The computer system further includes a user interface element having instructions executed by the processor, where the user interface element is capable of accepting a comparison expression representing a rule associated with the feature of the part. The comparison expression is specified via the user input device and displayed on the display. The computer system further includes a database for storing the rule.

An embodiment of the present invention includes a system for manufacturing a part using a computer system. The system includes: a database having a plurality of rules and a plurality of machining cycles; a CNC program for manufacturing the part on a CNC machine; and a generating program stored in a computer readable medium for creating the CNC program. Further, the generating program includes: a rules evaluation module for selecting at least one machining cycle by evaluating at least one rule; and a CNC code generation module for generating a part of the CNC program using the machining cycle.

These and other embodiments, features, aspects and advantages of the invention will become better understood with regard to the following description, appended claims and accompanying drawings.

DETAILED DESCRIPTION OF THE INVENTION

In the following description, numerous specific details are set forth to provide a more thorough description of the specific embodiments of the invention. It should be apparent, however, to one skilled in the art, that the invention may be practiced without all the specific details given below. In other instances, well known details have not been described, so as not to obscure the invention.

A part that is manufactured from one or more materials is composed of one or more features, for example, holes, pockets, slots. Each feature has one or more attributes which describe physical characteristics of a feature. For example, for a hole the attributes include the location, diameter, and depth of the hole. In the case of machining a part from a block of material using a CNC machine, each feature is cut out of the block of material. For each feature, there is a corresponding cutting process that includes selecting which cutting tools to use and the tool operations to be performed. For the hole example, a cutting tool, e.g., a drill, and the tool operations, e.g., a tool path, are selected.

The features and corresponding attributes in certain limited cases may be automatically determined from the geometric model of the part using an image processing algorithm. Once the features and corresponding attributes are recognized a pre-selected process is used to machine the feature. Not all of the steps may be automatic, for example, the user may be asked to input values for the attributes. There are also some major disadvantages using this automated approach, such as inflexibility to change and non-reusability since the features, corresponding attributes, and associated processes are fixed, i.e., hard coded, in the manufacturing program.

One embodiment of the present invention has a goal of creating a uniform engineering environment for the manufacture of parts, not only for a specific company, but across companies. To achieve this goal one or both of the following are done: the databases used by design, manufacturing, and the shop for creating a part are centralized, which includes standardizing the data structures, and the CAM process is made visible and standard by the use of user defined rules. By having a uniform way of capturing and representing knowledge, the design engineer, manufacture engineer, the CNC programmer and CNC operator expertise can be captured and the system can improve by learning. In addition, beside intra-company exchange of knowledge, companies can exchange or sell/buy knowledge.

Figure 1:
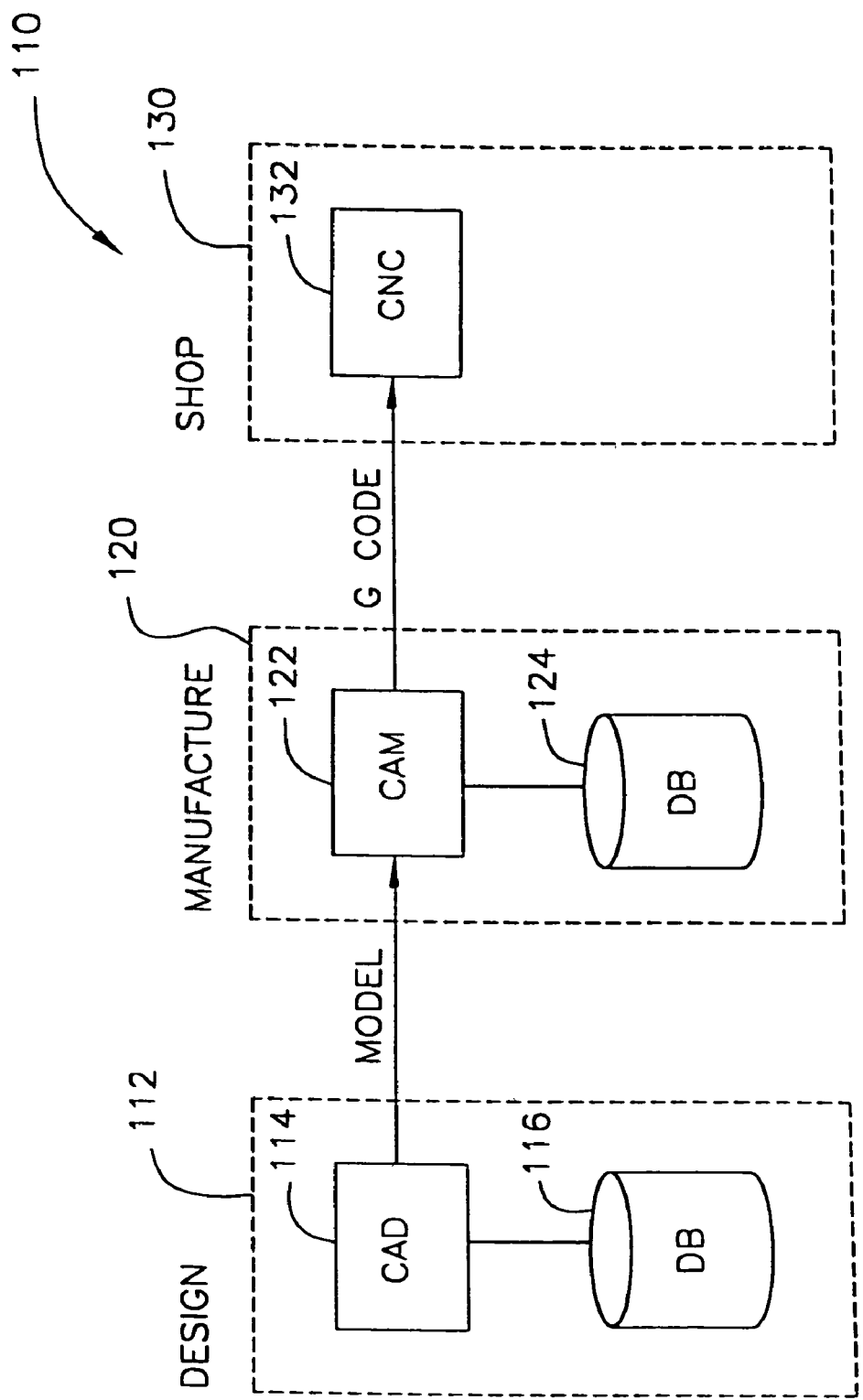
FIG. 1 is a diagram of an exemplary process of manufacturing a part of the prior art.
Figure 2:
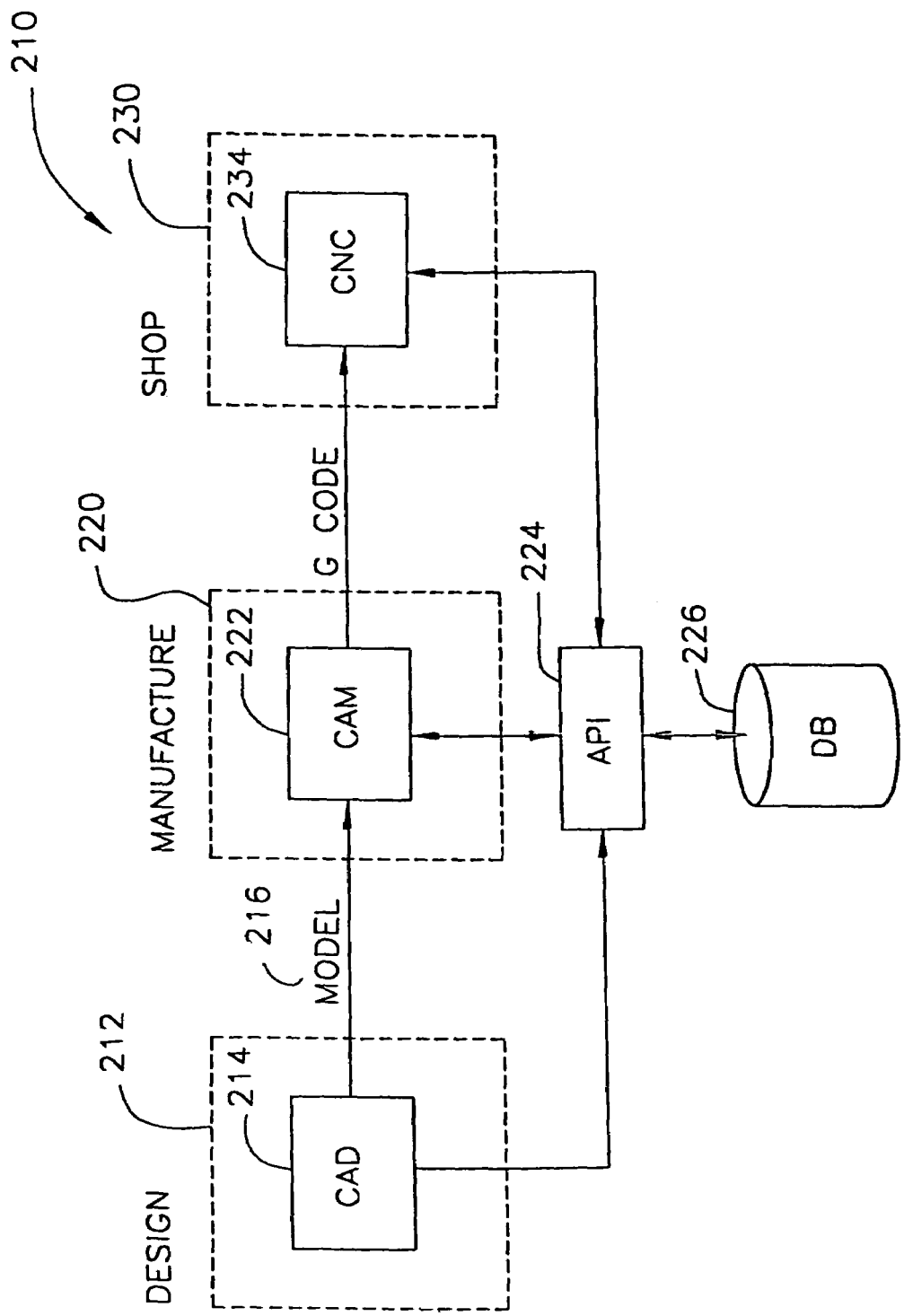
FIG. 2 is a diagram of a process for producing a part with a centralized database of an embodiment of the present invention.

FIG. 2 is a diagram of a process for producing a part with a centralized database of an embodiment of the present invention. FIG. 2 has one DB 226 which includes both the data in the design DB 116 and in the manufacturing DB 124 of FIG. 1. The design engineer in design section 212 uses CAD tool 214 to created the design model of the part using, e.g., Electronic Data Systems Corporation's Parasolid® solid modeler. The solid geometric model is stored in DB 226 using an application programming interface (API) 224. The API, by constraining what commands can be performed on DB 226, provides an ordered way of retrieving and storing data in DB 226. The manufacturing engineer in manufacture section 220 then gets the solid model from DB 226 and uses the CAM tool to insure the model has manufacturing features and attributes. The manufacturing engineer uses the annotated model and CAM tool to create a VB/VBA program. The VB/VBA program has the processes needed to machine each feature of the part. Hence, the VB/VBA program contains the expert knowledge of the programmer on "how" a part is to be manufactured. Next, the VB/VBA program is automatically converted to a CNC program having G code which is stored in DB 226. A shop engineer/technician in shop 230 retrieves the CNC program on CNC machine 234 from DB 226. If the shop engineer/technician needs to modify the G code program, then he/she uses all or part of another version of the CAM tool running on CNC machine 234. For example, suppose that the shop engineer/technician knows that a second process other than the one the manufacturing engineer selected has better performance for the particular CNC machine used. The shop engineer/technician could use the version of the CAM tool running on CNC machine 234 to change the VB/VBA program to use the second process. Since the changed VB/VBA code is stored in DB 226, it is accessible by the design and manufacturing engineers for future production of parts. In an alternative embodiment the CNC machine 234 has a personal computer (PC) connected to it, which is used instead of the CNC machine to run all or part of the other version of the CAM tool. The PC is also connected to DB 226 and is used to modify the G code.

In a preferred embodiment of the present invention the decision points on selection of features, attributes, and processes are explicitly given in the form of rules. A rule includes a code fragment or function that when executed returns a "True" or "False" Boolean value. The code fragments or functions are stored in the DB 226. Using the selected features, attributes, and processes, cutting tools and machining operations, e.g., the tools cutting feeds and rotational speeds and tool path, are determined and a CNC program is generated to machine the part on a CNC machine.

Since a part has one or more features, were each feature has one or more attributes, a first set of rules are assigned to the features and a second set of rules are assigned to the attributes. In addition since a process specifies how a feature is made and there may be multiple processes, i.e., ways, to make a feature, a third set of rules is assigned to decide which process should be used. If the third set of rules indicate multiple processes should be used then a human expert or a computerized expert system makes a selection on which process to use and the third set of rules are refined.

Figure 3:
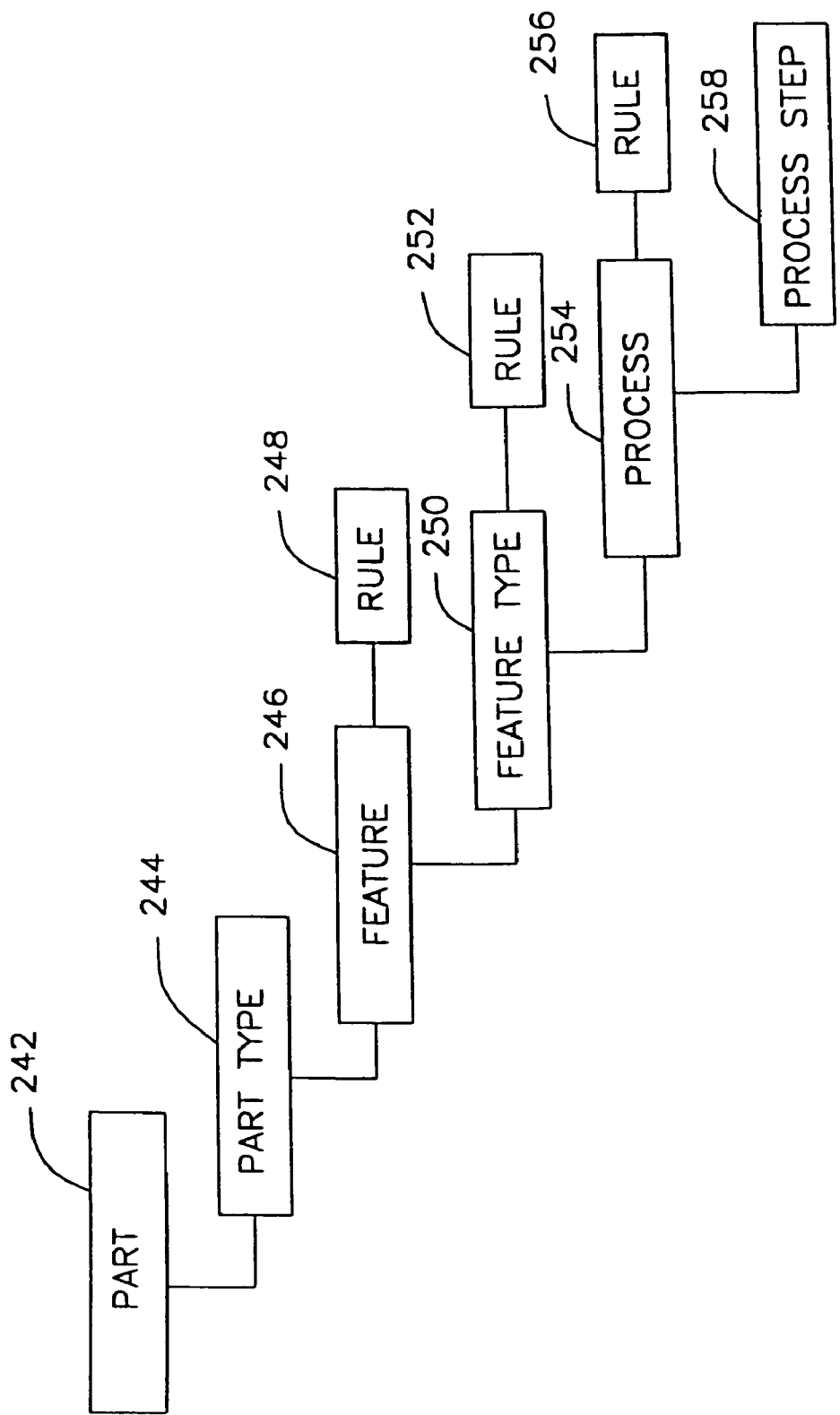
FIG. 3 is a part hierarchy of a preferred embodiment of the present invention.

FIG. 3 is a part hierarchy of a preferred embodiment of the present invention. A part 242 is described by the geometric model, e.g., model 216 in FIG. 2. The part has one or more part types 244. Typically the user selects the part types belonging to the part 242. In an alternative embodiment the part types are automatically selected using rules (not shown). Each part type 244 has one or more features 246. The part type 244 has also one or more feature recognition rules 248 that allow selection of the features 246 associated with the part type 244. A feature is selected when the feature recognition rule evaluates to true. Although each feature 246 may have one or more feature types 250, in the preferred embodiment, there is one feature type for one feature. Hence the feature type 250 is the primary classification for a feature 246 of a part type 244. The feature type associated with the feature is determined from evaluating rule 252.

An example of part types associated with a solid geometric model of a part may include a prismatic milled part, mold component, and die component. If the user selects part type, i.e., die component, then the feature recognition rules 248 may look for features 246, e.g., holes, pockets, and profiles in the geometric model. If rule 248 evaluates to true for a hole feature 246, then there may be one or more feature types, e.g., counterbored hole, threaded hole, or tapped hole. The feature type 250 selected is dependent on rule 252 evaluating to true.

Each feature type 250 has associated with it one or more processes 254. To determine if the process is applicable to the feature type, the accompanying rule 256 is evaluated. Each process has one or more process steps 258. Each feature type 250 may also have one or more attributes (not shown), where an attribute describes a physical characteristic of a feature. An attribute can be further subdivided to include a key with zero or more values.

Figure 4:
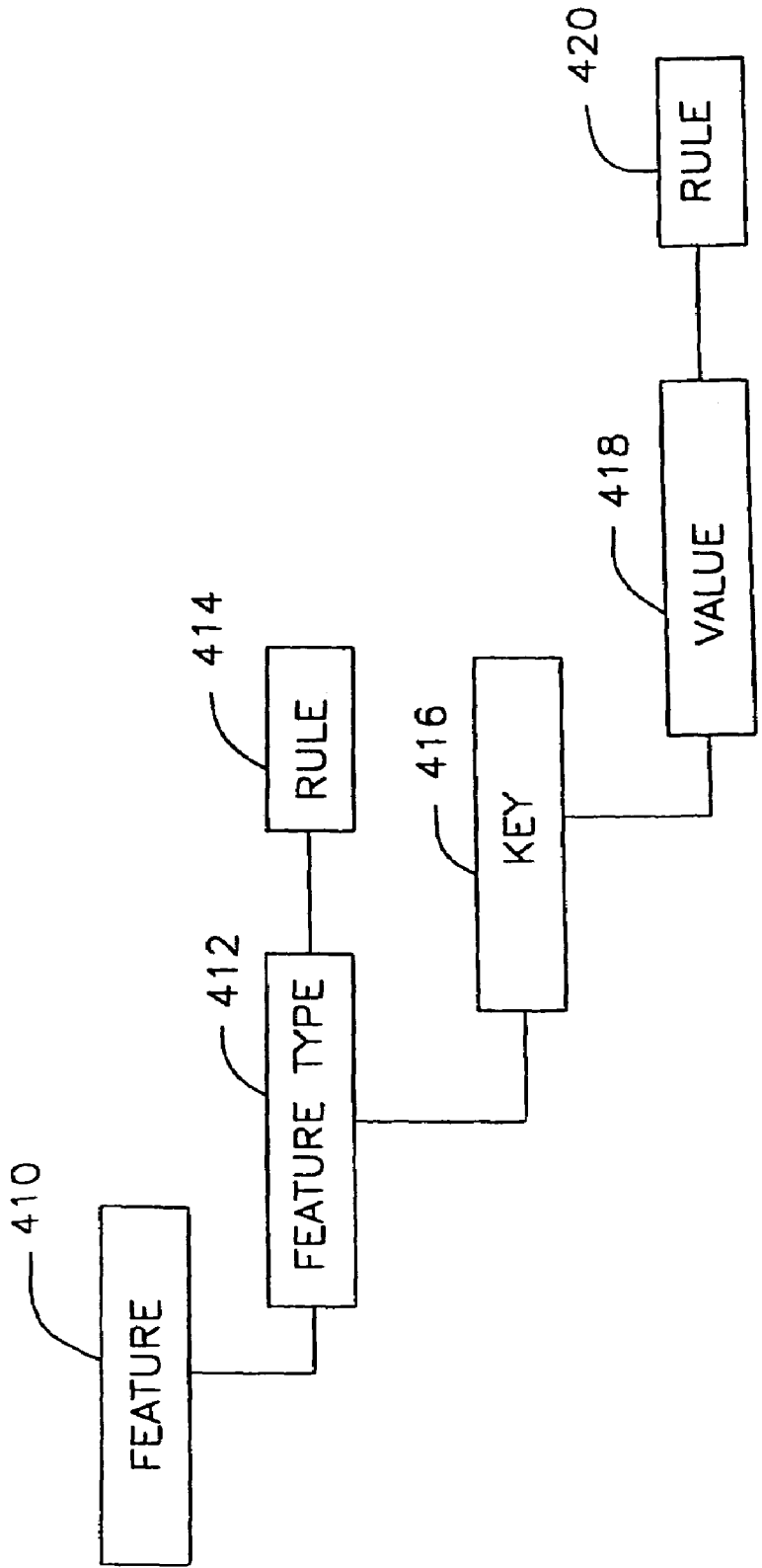
FIG. 4 is a feature hierarchy of another embodiment of the present invention.

FIG. 4 is a feature hierarchy of another embodiment of the present invention. A feature 410 has one or more feature types 412. An attribute of each feature type 412 has been further subdivided to include a key and one or more values. Hence, each feature type 412 has one or more keys 416. Each key 416 has one or more values 418, where if no value is specified by the user for a key, the value is assigned to be "undefined". To determine if a particular feature type 412 is applicable to a particular feature 410, the accompanying rule 414 is evaluated to determine if it is "true". All the keys 416 for an applicable feature type 412 are next retrieved. To determine if a particular value 418 is applicable to a particular key 416, the accompanying rule 420 is evaluated to determine if it is "true".

Hence each feature type (or feature) has one or more keys and each key has one or more values assigned to it, including the possibility of having a value assigned as "undefined". Each feature type thus has one or more key/value pairs. The feature type along with a combination of one or more of its key/value pairs is called a feature case. The feature case is used to search for the one or more processes that is to be used in manufacturing the feature in the part.

Figure 5:
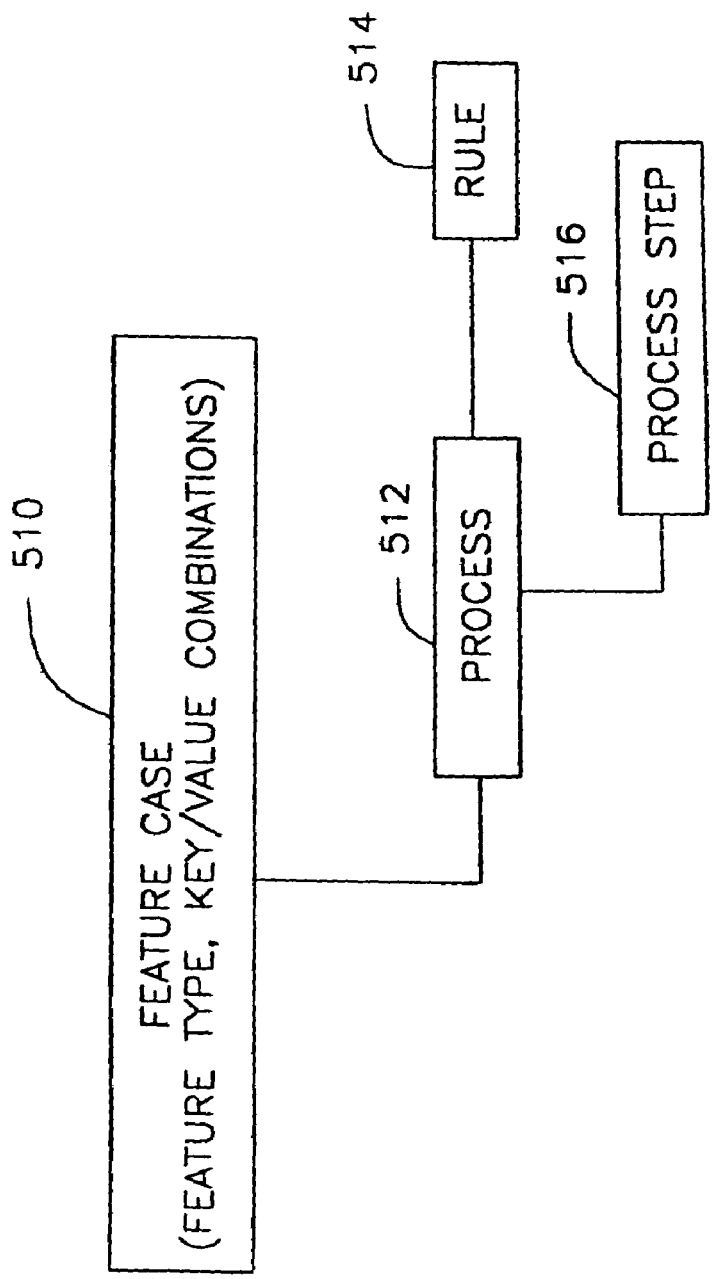
FIG. 5 is a feature case hierarchy of a preferred embodiment of the present invention.
Figure 8:
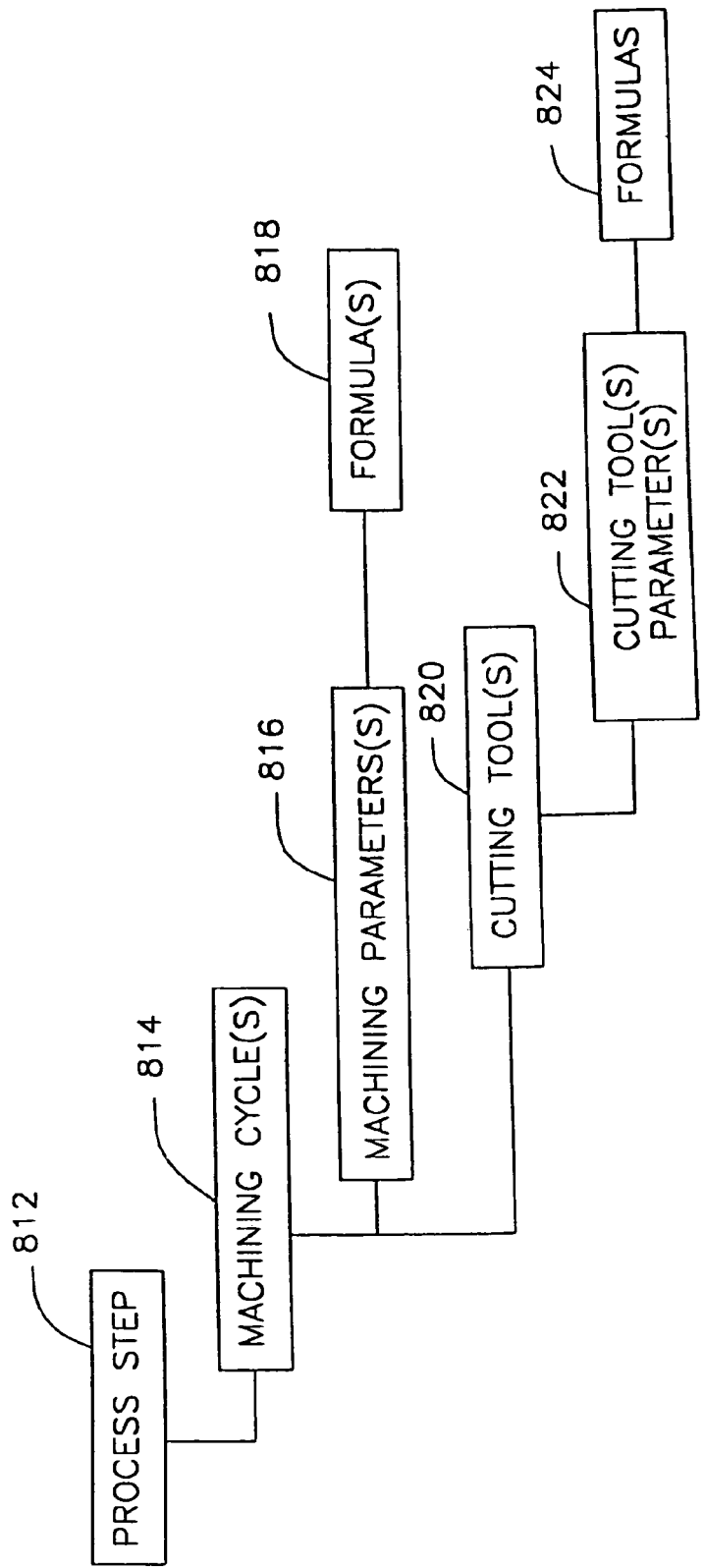
FIG. 8 is diagram of a process step of an embodiment of the present invention.

FIG. 5 is a feature case hierarchy of a preferred embodiment of the present invention. Each feature case 510 has one or more processes associated with it. To determine if a particular process 512 is applicable for a particular feature case 510, the accompanying rule 514 is evaluated to determine if it is "true". Each process has one or more process steps 516. The process step hierarchy is shown in FIG. 8. The process steps 516 describe, for example, the cutting tools, machining parameters, and machining cycles to be used in making the part on the CNC machine.

Figure 6:
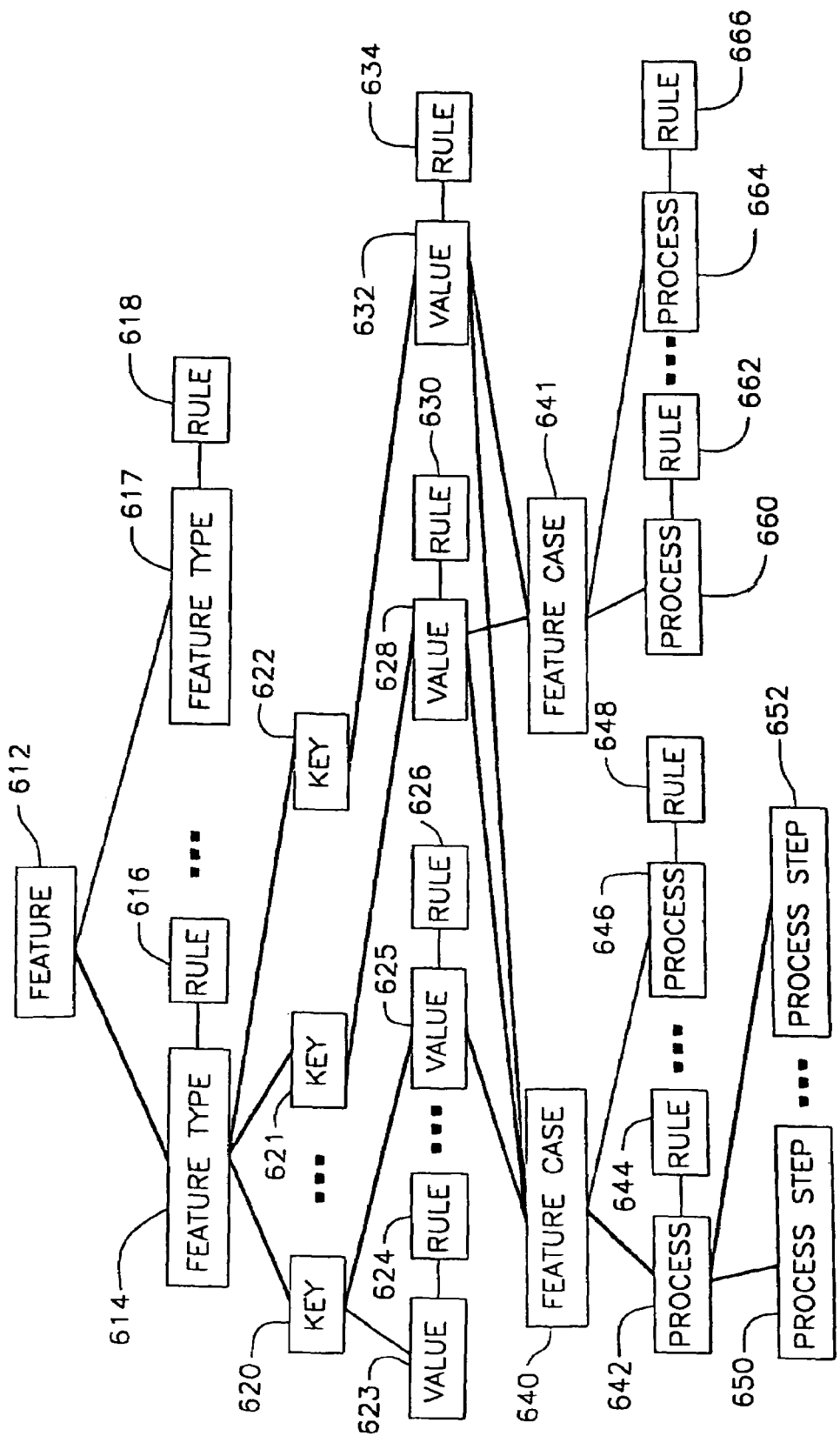
FIG. 6 is a tree diagram of the feature, feature type, key, value, and process relationships of one embodiment of the present invention.

For the two examples of feature cases below, assume the following feature types and key/values:
Feature type="Threaded Hole M"
Key1="Size", Possible Values "M8", "M9", "M10" . . .
    Assigned
Value="M10"
Key2="Tolerance", Possible Values "H1", "H2", "H3" . . .
    Assigned
Value=-undefined-
The first example of a feature case is:
Feature type="Threaded Hole M"
Key1/value="M10"
Key2/value=-undefined-
The second example of a feature case is:
Feature type="Threaded Hole M"
Key2/value=-undefined- FIG. 6 is a tree diagram of the feature, feature type, key, value, and process relationships of one embodiment of the present invention. FIG. 6 is similar to FIGS. 4 and 5, except FIG. 6 is illustrated as a tree. For the purposes of illustration, only two children nodes in the tree are shown for each parent node. However, it should be understood that there may be one, two, three, and more children nodes for each parent node, e.g., one more feature types for each feature. A feature 612 has one or more feature types, e.g., 614 and 617, where each feature type has an associated rule, e.g., 616 and 618, respectively. Each feature type has one or more keys, e.g., feature type 614 has, e.g., keys 620 to 621, and 622. Each key has one or more values, e.g., key 620 has values 623 to 625, where each value has an associated rule, e.g., 624 to 626, respectively. For illustration purposes, other examples of keys include key 621 with value 628 and associated rule 630, and key 622 with value 632 and associated rule 634. For keys 621 and 622 only one value each is shown in order to simplify the explanation of a feature case. In other examples each key has one or more values. Feature cases 640 and 641 include feature type 614 and combinations of key/value pairs, i.e., combinations of one or more key/value pairs. Feature case 640 has key/value pairs, key 620/value 625, key 621/value 628, and key 622/value 632. Feature case 641 has key/value pairs, key 621/value 628, and key 622/value 632.

Each feature case has one or more processes, e.g., feature case 640 has processes 642 to 646, where each process has a rule, e.g., 644 to 648, respectively. Feature case 641 has processes 660 to 664 with associated rules 662 to 666. If the process rule evaluates to true, then the associated each process has one or more process steps, e.g., process 642 has process steps 650 to 652.

The rules in FIG. 6 are logical expressions, which if true, select the associated feature, feature type, key/value, or process. The rules prune the tree in FIG. 6, and the code associated with the selected processes are inserted in the manufacturing program to machine the part. A logical expression includes any fragment of code that evaluates to a logical "true" or "false" value. For example, let the symbol "A" be a comparison expression such as "Feature.layer.name="ThreadedHoles"; let the symbol "B" be a comparison expression such as "feature.diameter <0.5"; and let the symbol "C" be a comparison expression such as "feature.customproperties("Pitch").value=14". A logical expression includes A, B, or C individually, as well as any logical combination of A, B, and C, e.g., (A OR B AND C), (A AND NOT B), NOT C, (B XOR C NOR A). The user may write the comparison, code fragments, and logical expressions using VB.

As an example of the use of FIG. 6, assume that there are the following items for the feature type, keys, values and processes for a part having a hole to be drilled in it.
Feature Type="Threaded Hole M"
Key1="Size", Possible Values "M8", "M9", "M10",
    Selected Value="M10",
Possible Processes="P1", Selected Process="P1"
Key2="Tolerance", Possible Values "H1", "H2", "H3",
    Selected Value="undefined", Possible Processes "P1",
    "P2",
Selected Process="P1"

In our example the feature 612 has feature type 614 "Threaded Hole M". In this case there is no need for rule 616, as there is only one feature type. Feature type "Threaded Hole M" has two keys, Key2 620 and Key1 621. Key 1 has three possible values, "M8", "M9", and "M10". The rules associated with values "M8" and "M9" are false and the rule associated with "M10" is true. Hence the selected value for Key1="Size" is "M10." In one embodiment the first rule that is evaluated to true is chosen. In an alternative embodiment, if there is more than one rule that evaluates to true the user is asked to select the value or an artificial intelligence (AI) expert system does the value selection. For the case of Key1 with selected value "M10," there is only one process P1 that will be used to machine a hole of size "M10". Key2 has possible values "H1", "H2", "H3", and a default value of "undefined". The default value is chosen, when the rules for "H1", "H2", and "H3" evaluate to false. For Key2 with "undefined value", there are two processes, "P1" and "P2 ". Process rule for P1 evaluates to true, so that process "P1" is selected. Process "P1" has one or more process steps which will drill a treaded hole with size "M10" and tolerance "undefined" (e.g., any tolerance or a predetermined user specified tolerance).

Figure 7:
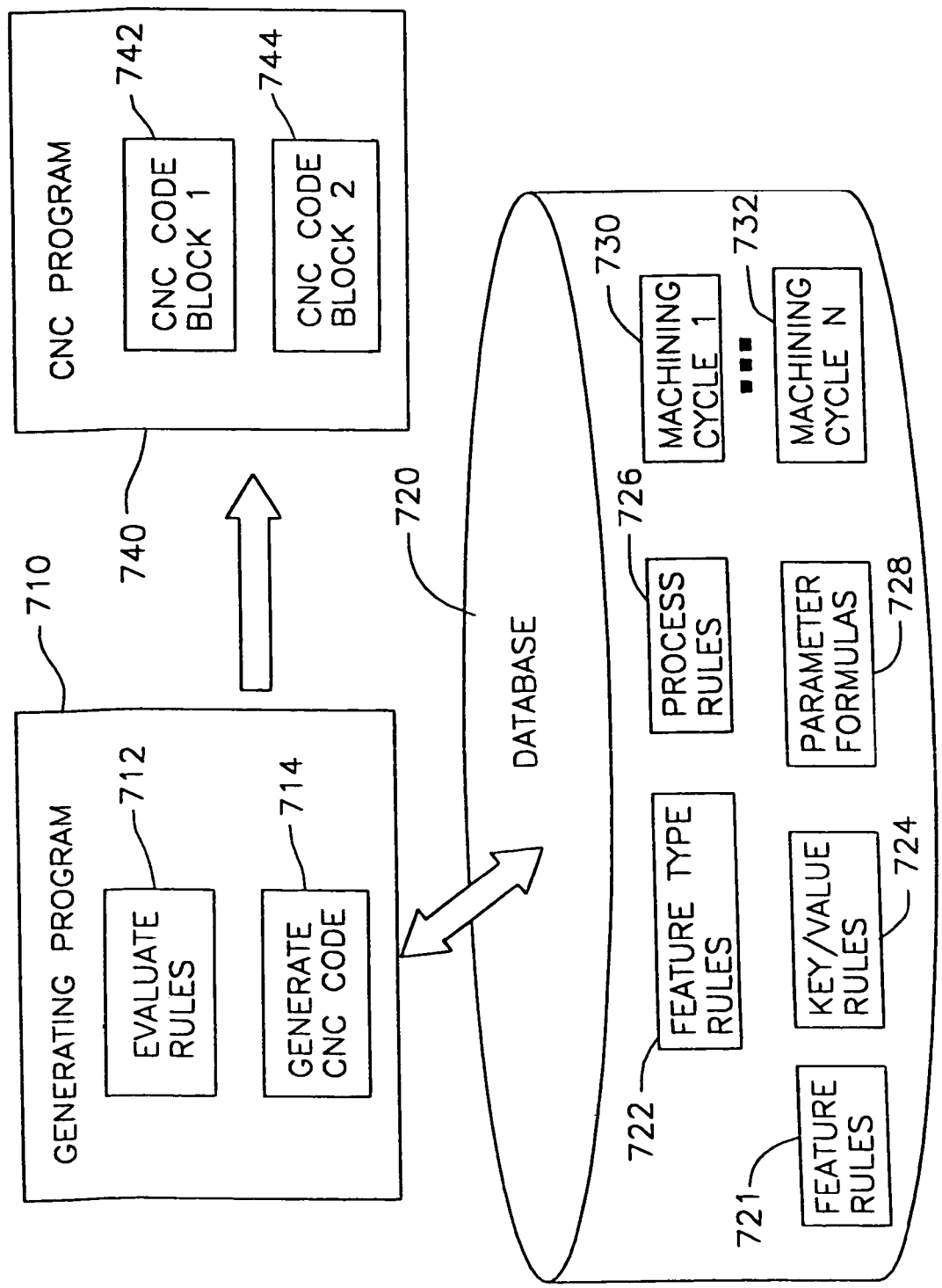
FIG. 7 is a block diagram of a portion of a generating program which creates a part of a CNC program of an embodiment of the present invention.

FIG. 7 is a block diagram of a portion of a generating program 710 which creates a part of a CNC program 740 of an embodiment of the present invention. Program 710 includes a software module 712 to evaluate the rules and a software module 714 to generate the CNC program 740. The programs 710 and 740 are stored in a computer readable medium. A computer, having a processor and a memory, executes generating program 710 to produce CNC program 740. The computer is connected to database (DB) 720 via a communications link. Generating program 710 uses data from DB 720. The evaluate rules module accesses rule tables, e.g., feature rules 721, feature type rules 722, value rules per key 724, and process rules 726, and evaluates the rules in these tables to true or false, where the rules include, e.g., logical expressions, function calls with a logic true/false return value, and code fragments that evaluate to true or false. Because the user inputs these rules directly into DB 720, the generating program does not need to be changed when the rules change. In an alternative embodiment, generating program 710 is self-modifying, i.e., modifies itself to result in CNC program 740.

DB 720 also has a table 728 having parameter formulas for the machining parameters or conditions (there is also another table (not shown) for the cutting tools and associated parameters). Each parameter has an associated formula, which in some cases may be a single predetermined number, which when evaluated gives the parameter a numerical value. The parameters (not shown) are also stored in DB 720. In addition the DB 720 includes a plurality of machining cycles, where each machining cycle includes a section of predetermined source code (for example, in C++), e.g., machining cycle 1 730 to machining cycle N 732, where N is an integer number. A process step via the generate CNC code module 714 will use a machining cycle to generate a CNC block of code, e.g., CNC code block 1 742 or CNC code block 2 744, where the CNC block of code includes the tool path (G-code). The CNC code blocks are inserted into the CNC program 740, which is used to machine the features on the part on a CNC machine.

FIG. 8 is diagram of a process step of an embodiment of the present invention. Each process step 812 has one or more machining cycles 814. Each machining cycle 814 has one or more machining parameters 816 and one or more cutting tools 820. Each cutting tool 820 has one or more cutting tool parameters 822. A machining parameter 816 has associated with it an optional formula 818 that is used in calculating a numerical value to be assigned that machining parameter. A cutting tool parameter 822 has associated with it another optional formula 824 that is used in calculating a numerical value to be assigned that cutting tool parameter.

An example of the rules and formula in FIGS. 4, 5, and 8 is:

Feature type rule: (feature.layer.name="ThreadedHole")
Value rule: (isequal (feature.diameter, 10))
Process rule:(islessthan(feature.area, 10) AND islessthan (feature.volume, 20))
Machining Parameter formula: ((tool.diameter*0.85)+ 0.001)

Figure 9:
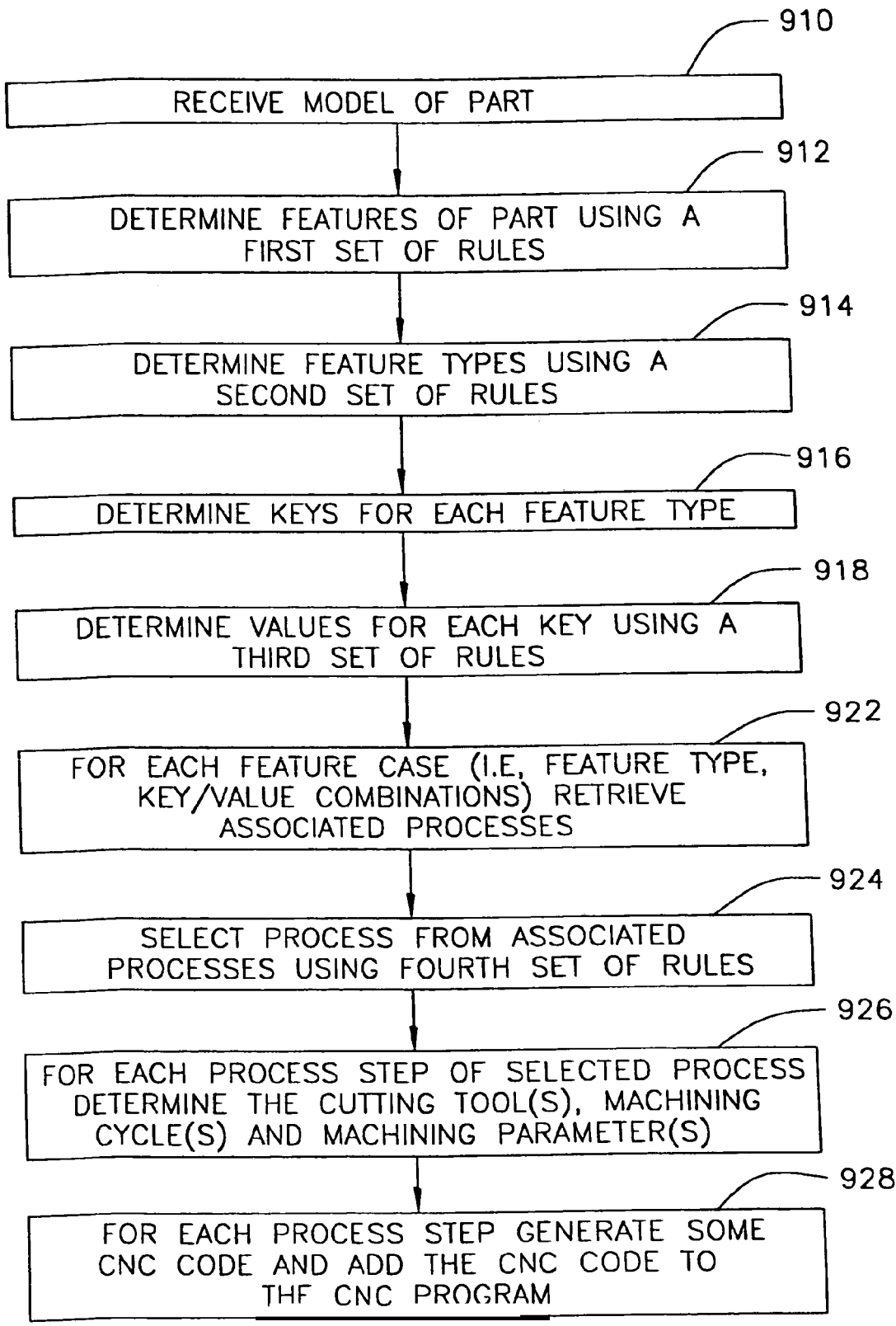
FIG. 9 is a flowchart for creating a manufacturing program of another embodiment of the present invention.

FIG. 9 is a flowchart for creating a manufacturing program of another embodiment of the present invention. At step 910 a model of the part is retrieved from database 720. The features of the part are selected from a list of features using a first set of rules (step 912). The feature types of each feature are selected from a list of feature types using a second set of rules (step 914). At step 916, a list of keys is retrieved for each feature type. At step 918, a value for each key is selected using a third set of rules. For each selected feature type with a combination of one or more key/value pairs, one or more feature cases are created. For each feature case the database 720 is accessed to retrieve a list of associated processes (step 922). At step 924 from this list of associated processes, a process is selected for the feature case using a fourth set of rules. At step 926, for each process step of each selected process the machining cycle(s) and associated machining parameters and cutting tools and associated cutting tool parameters are determined. For each machining parameter a numerical value is determined using the associated formula. The numerical value may optionally be a cost. For each cutting tool parameter a numerical value is determined using the associated formula. At step 928, for each process step, a portion of CNC code is generated and inserted into the CNC program.

The preferred embodiment of the present invention uses the following pseudo code to generate the machining cycles which are used to give the CNC code to machine the features of the part type.

```
Select Possible Feature Types for Part Type from DB
For Each Possible Feature Type
        if Evaluate(Possible Feature.Rule) = True then
        Assign Feature type to Part Type
        Exit
        End_If
End_For #Next Possible Feature Type #
Select Keys for Feature Type
For Each Key
   Select Possible Values for Key from DB (where default value = undefined)
   For Each Possible Value
        if Evaluate(Possible Value.Rule) = True then
            Assign Value to Key (create key/value pair)
        Exit
        End_If
   End_For #Next Possible Value#
End_For #Next Key #
Determine a Feature Case for Each Feature type using The Feature Type and a
combination of Associated Key/Value Pairs
   Select Possible Processes For Each Feature Case
   For Each Possible Process
        if Evaluate(Possible Process.Rule) = True then
        Assign Process to Feature Type
        Exit
        End_If
   End_For #Next Possible process#
   For Each Process Step in Assigned Process # a process step includes one
machining cycle in combination with a given set of parameters values#
        Select Machining Parameters from DB
        Evaluate Formula for Each Machining Parameter to Calculate Machining
   Parameter Value
        Select Cutting Tool(S) and Calculate Cutting Tool Parameters
        Create a Machining Cycle from Machining Parameters and Selected
   Cutting Tool(s)
        End_for #Next Process Step#
        END
```

In one embodiment the above pseudo code is written in VB/VBA and is interpreted by the Visual Basic interpreter to create the CNC program in real-time.

Figure 10:
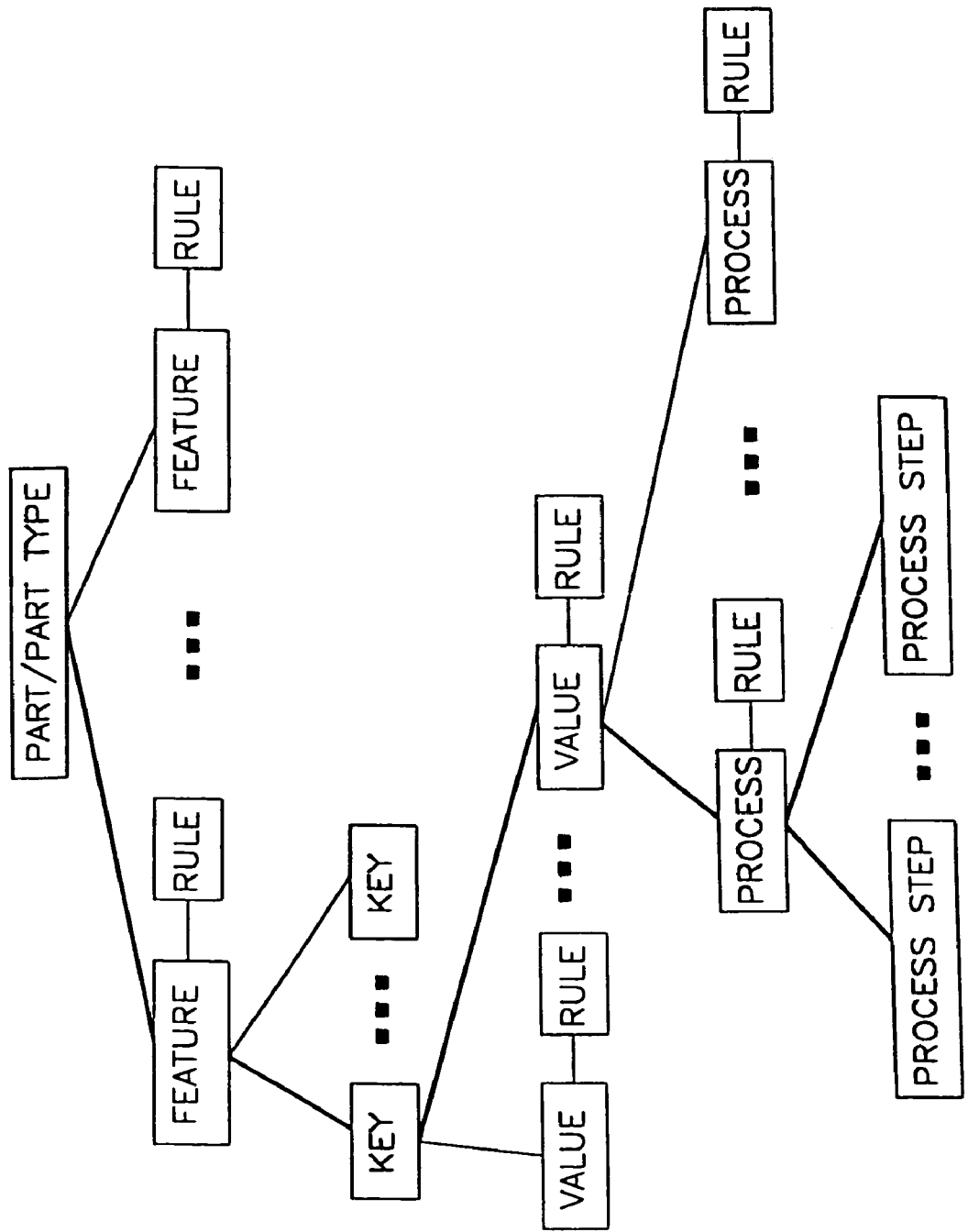
FIG. 10 is a tree diagram of the part, feature, key, value, and process relationships of an alternative embodiment of the present invention.

FIG. 10 is a tree diagram of the part, feature, key, value, and process relationships of an alternative embodiment of the present invention. FIG. 10 is represented as a tree. For the purposes of illustration, only two children nodes in the tree are shown for each parent node; However, it should be understood that there may be one, two, three, and more children nodes for each parent node, e.g., one more features for each part. A part or part type 1012 has one or more features (or feature types), e.g., 1014 and 1017, where each feature (or feature type) has an associated rule, e.g., 1016 and 1018, respectively. Each feature (or feature type) has one or more keys, e.g., feature (or feature type) 1014 has, e.g., keys 1020 and 1021. Each key has one or more values, e.g., key 1020 has values 1022 and 1025, where each value has an associated rule, e.g., 1024 and 1026, respectively. Each value has one or more processes, e.g., value 1025 has processes 1030 and 1034, where each process has a rule, e.g., 1032 and 1036 respectively. Each process has one or more process steps, e.g., process 1030 has process steps 1040 and 1042.

In FIG. 10 different parts may have the same feature (or feature type), different features (or feature types) may have the same key, different keys may have the same value, different key/value pairs may have the same process, and different processes may have the same process step. Thus the term "tree" has been used to simplify explanation and FIG. 10 is actually a graph, which may include a tree. In one embodiment a feature (or feature type) and all the feature's key/value pairs have one or more associated processes. In an alternative embodiment a feature (or feature type) and each key/value pair has one or more associated processes. In other embodiments a feature (or feature type) and one or more key/value pairs have one or more associated processes.

Rather than traverse the tree of FIG. 10, after the feature (or feature type) rules determine the features (or feature types) in a part or part type and the value rules determine the values for each key, the possible feature cases are determined, where a feature case, comprises a feature (or feature type) of the part and all the key/value pairs for that feature (or feature type). The feature case is then used to search DB 720 to find the possible associated processes.

Figure 11:
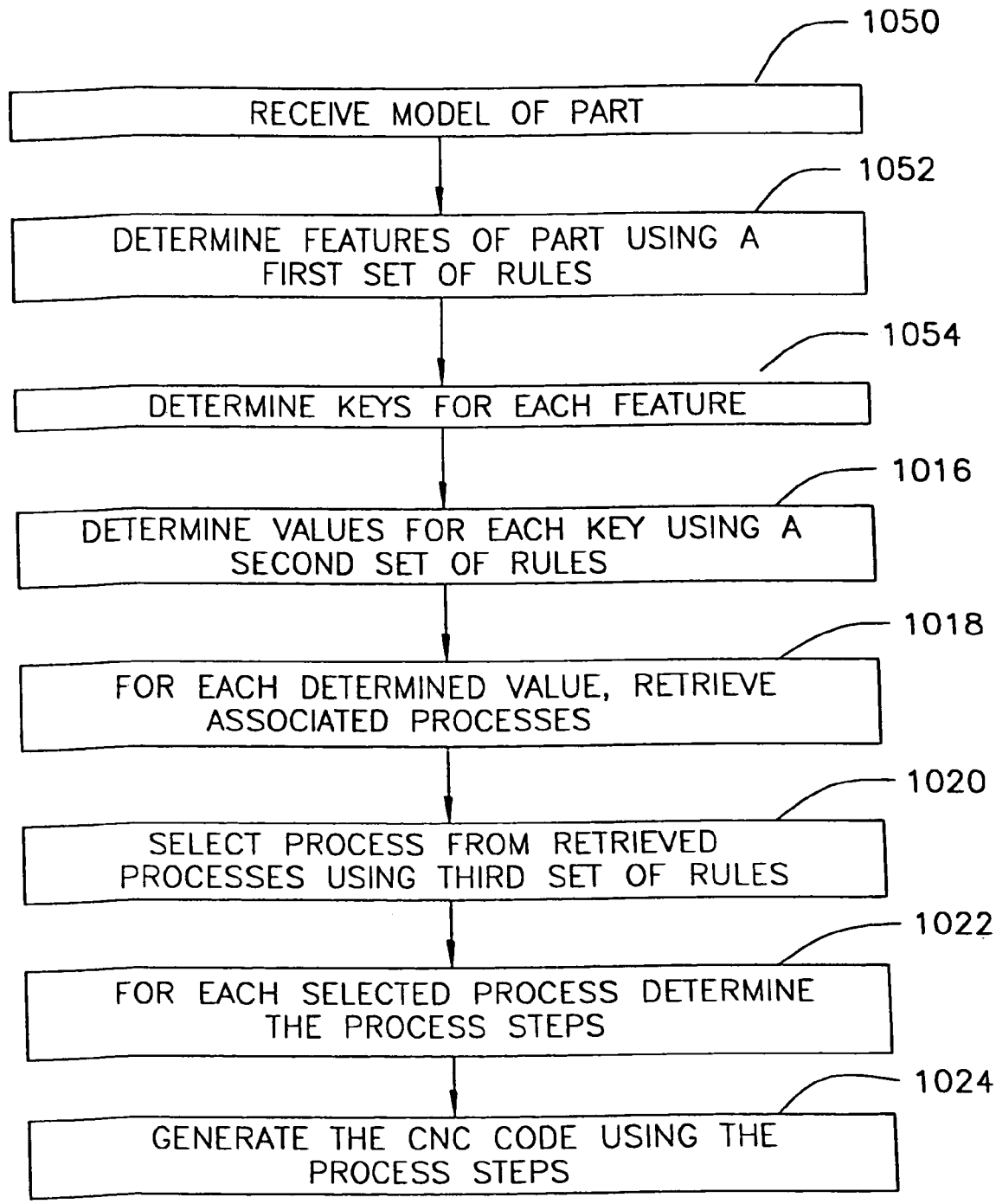
FIG. 11 is a flowchart for a generating program used to create a manufacturing program of an alternative embodiment of the present invention.

FIG. 11 is a flowchart for a generating program used to create a manufacturing program of an alternative embodiment of the present invention. At step 1050 a model of the part is retrieved from DB 226. The features of the part are selected from a list of features using a first set of rules (step 1052). At step 1054, a list of keys is retrieved from the DB 226 for each feature. At step 1016, a value for each key is selected using a second set of rules. The default value is either "undefined" or may be set to a predefined value by the user. For each value a list of associated processes is retrieved from DB 226 (step 1018) and from this list of associated processes, a process is selected using a third set of rules (step 1020). For each selected process one or more process steps are retrieved from the DB 226 (step 1022). At step 1024, the associated CNC code associated with each process step is generated and inserted into the CNC program.

Figure 12:
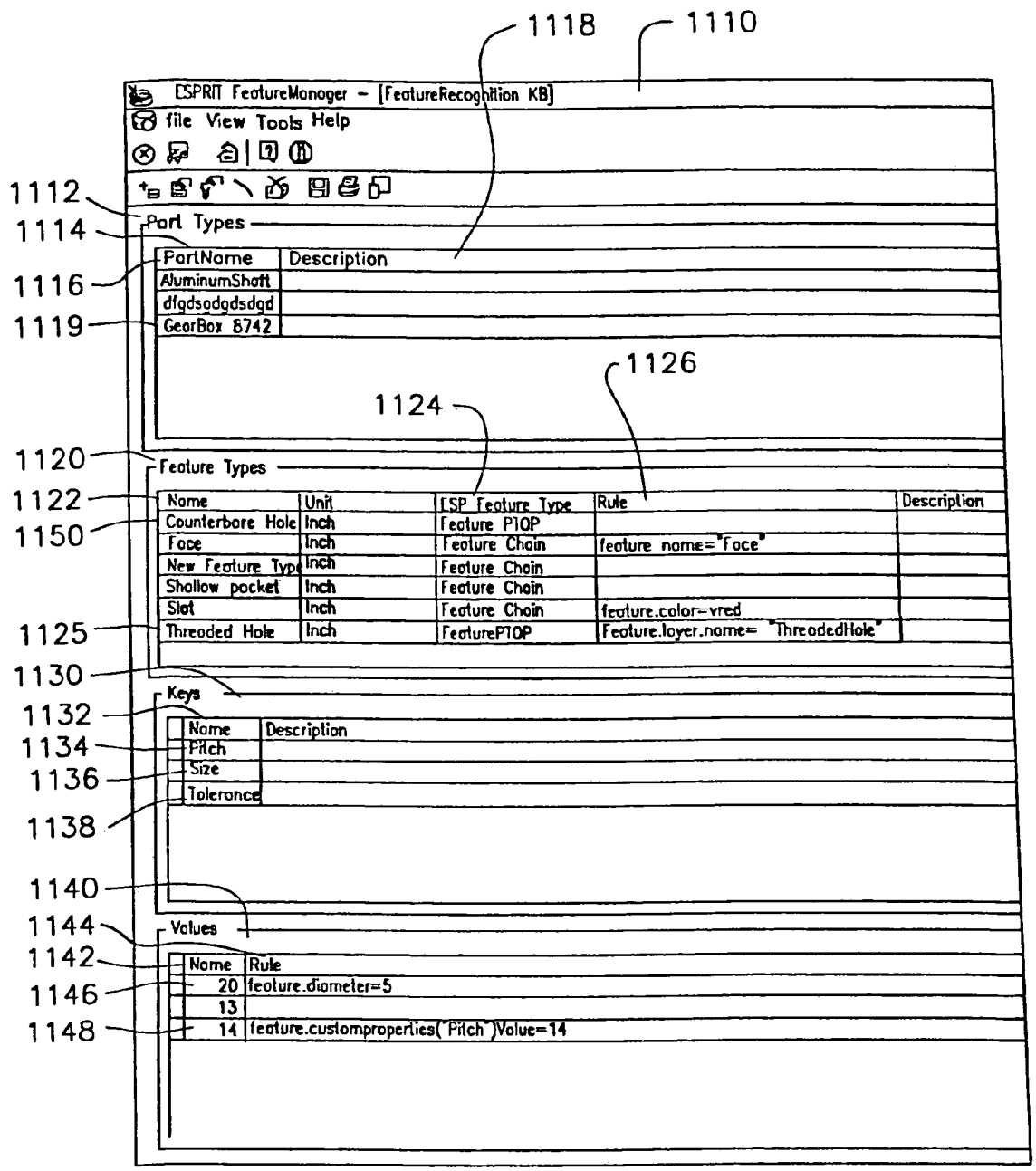
FIG. 12 is an example of a feature manager display of an aspect of the present invention.

FIG. 12 is an example of a feature manager display of an aspect of the present invention. Feature manager window 1110 has four sub-windows, i.e. a part types sub-window 1112 listing the part types, a feature type sub-window 1120 listing the feature types for a highlighted part type, a keys sub-window 1130 listing the keys for a highlighted feature type, and a value sub-window 1140 listing values for a highlighted key. For example, in the part type sub-window 1112 part name 1116 "Gear Box 8742" 1119 is highlighted and the description column 1118 is unfilled. The feature type sub window 1120 has a column for the feature type name 1122, the feature object type 1124, and the feature type rule 1126. The feature types listed are for part type "Gear Box 8742." The feature row 1125 with feature type name "threadedhole," feature object type "FeaturePTOP", and feature type rule "Feature.layer.name='ThreadedHoles" is highlighted. The keys sub-window 1130 has three keys for feature "threadedhole": Pitch 1134, Size 1132, and Tolerance 1138, where Pitch 1134 is highlighted. The value sub-window 1140 has a value name column 1142 and a rule column 1144. The values listed are for the Pitch key. Value name "20" 1146 has rule "feature.diameter=0.5". Value name "14" 1148 has rule "feature.customproperties("Pitch").value=14".

Figure 13:
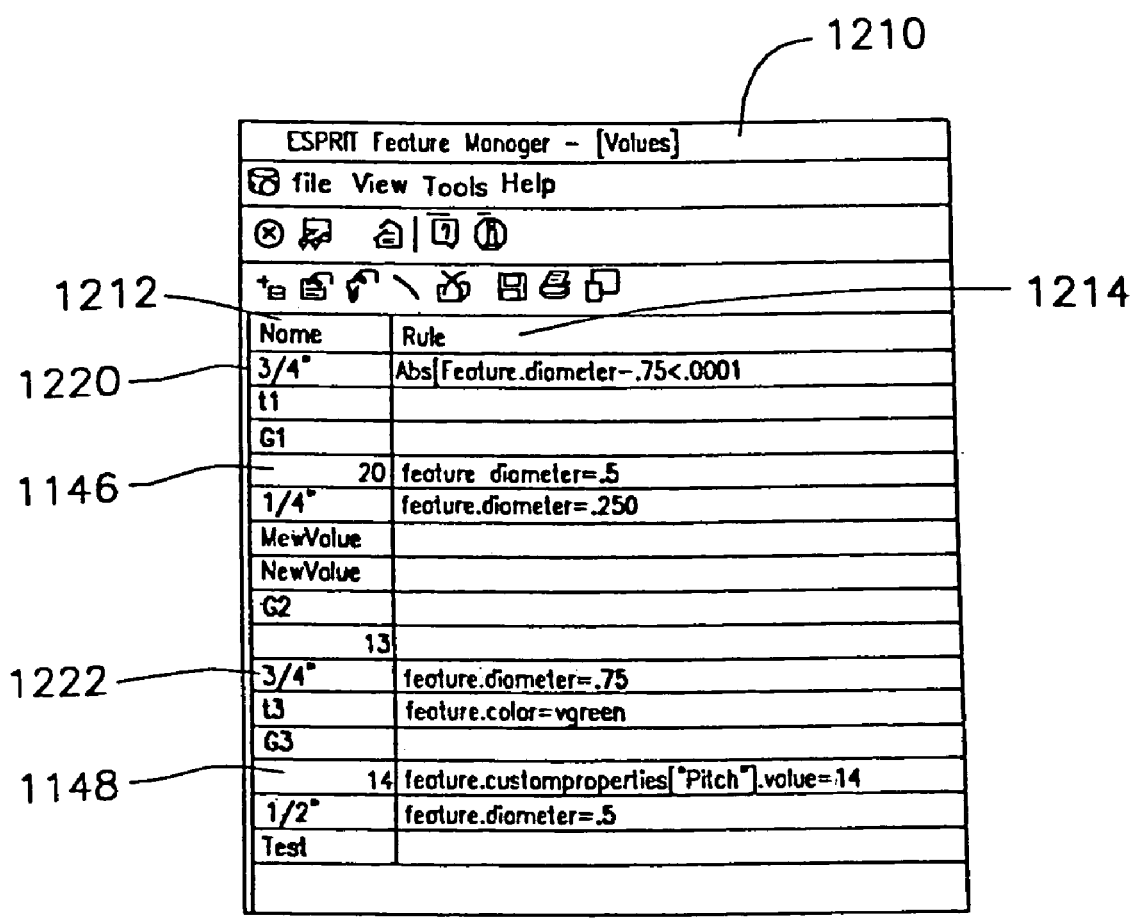
FIG. 13 is an example of a window listing a set of values and associated rules of another aspect of the present invention.

FIG. 13 is an example of a window 1210 listing a set of values and associated rules of another aspect of the present invention. FIG. 13 illustrates that a condition in a rule can take many forms. There is a column for the name of the value 1212 and a column for the rule 1214 which selects the value. For example, value "¾"" 1220 has a comparison expression for a rule, i.e., "Abs(Feature.diameter—0.75) <0.0001," which evaluates to either true or false. Value "¾"" 1222 also has a rule "feature.diameter=0.75", where "feature.diameter" may be a function call returning a numerical value.

Figure 14:
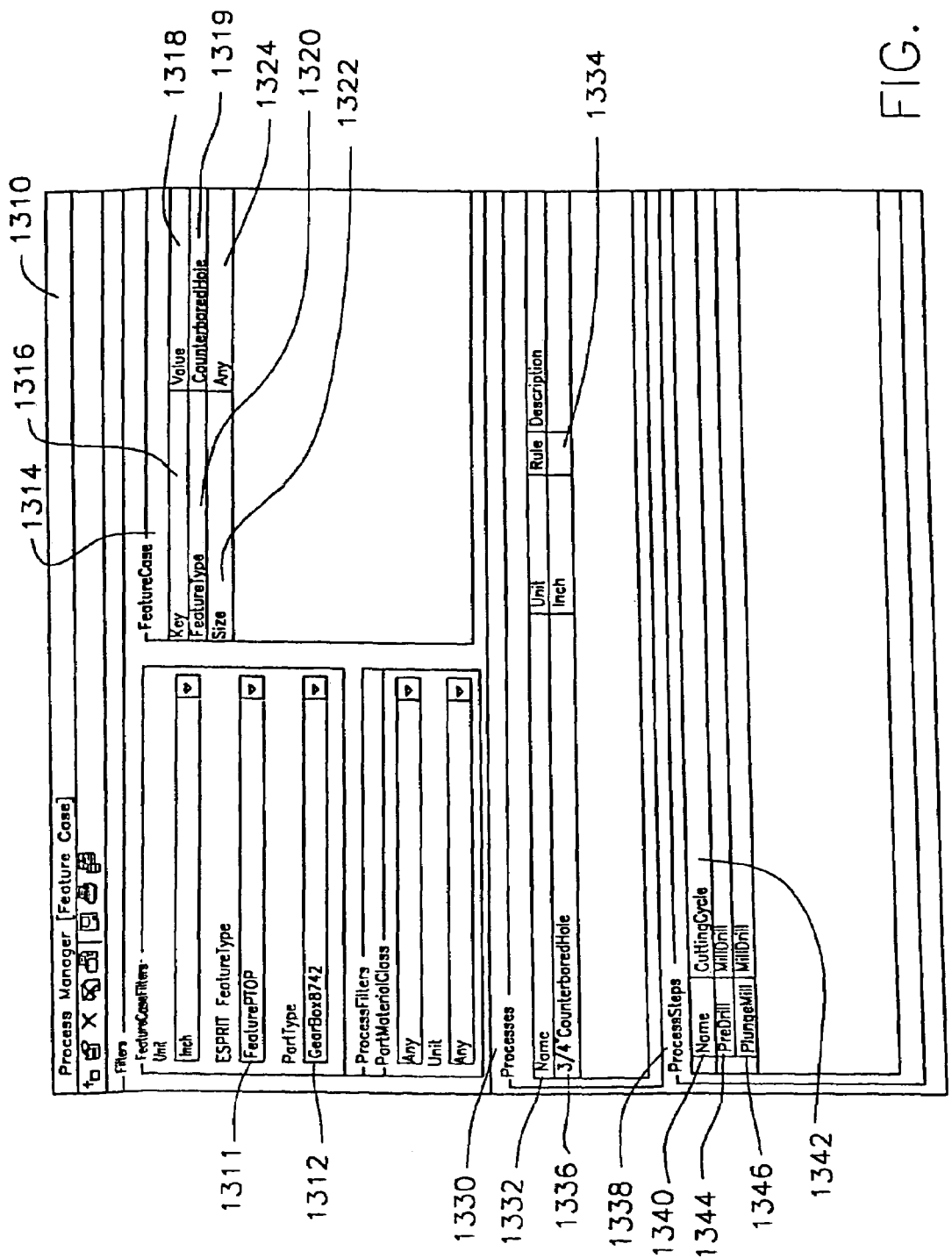
FIG. 14 shows a feature case window of an aspect of the present invention.

FIG. 14 shows a feature case window 1310 of an aspect of the present invention. The part type shown in selection 1312 is "Gear Box 8742" with feature type object in selection 1311 as "FeaturePTOP". In the feature case sub-window 1314 there is a key column 1316 and a value column 1318. One feature case is shown for feature type ("Feature Type" 1320) "Counterbored Hole" 1319, key="Size" 1322 and value="Any" 1324. These items are also shown in the feature manager window of FIG. 12. For example, in row 1150 of the feature sub-window 1120, the feature "Counterbored Hole" with object type "TeatureP-TOP" is displayed. In the processes sub-window 1330 the name of the processes for the feature case displayed in sub-window 1314 is shown. In this case only one process 1336 is shown, i.e., "¾" Counterbored Hole," with an undefined rule 1334. The process steps sub window 1338 has a column for the process step name 1340 and for the corresponding cutting cycle 1342. The two process steps shown, 1344 and 1346, are for Pre Drill and Plunge Mill and the corresponding cutting cycle 1342 is "MillDrill".

From the above example, it can be seen that multiple feature type, value, and process rules may be true at the same time, and a conflict of which rule to execute may occur. In one embodiment, the user is shown the choices and must select one of the choices. The user by setting a logical expression to automatically select his/her choice, has incorporated his/her decision rationale into the system, e.g., generating program 710. Thus the expert, i.e., user, is teaching the system, and the system is capturing the expert's knowledge. In another embodiment, a default priority may be set.

In the preferred embodiment the CAM program has a GUI, e.g., FIGS. 12–14, to define and display rules, feature types, keys, values, processes, and process steps. These definitions are stored in the DB. When the generating program 710 analyzes a geometric model of the part/part type, the appropriate feature types, keys, values, and processes are selected automatically using the rules. For the selected processes, the code associated with each process step of each process is retrieved from DB 720 and used to create the CNC program 740. The CNC program 740 is then sent to program the CNC machine to produce the features of the part.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the invention has been described using a particular series of transactions and steps, it should be apparent to those skilled in the art that the scope of the invention is not limited to the described series of transactions and steps.

Further, while the invention has been described using a particular combination of hardware and software, it should be recognized that other combinations of hardware and software are also within the scope of the invention. The invention may be implemented only in hardware or only in software or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed:

1. A method, using a computer system, for manufacturing a part, said method comprising:
   receiving a model of said part, said part having one or more features;
   retrieving a predetermined rule from a plurality of predetermined rules stored in a computer readable medium;
   selecting a feature of said model from said one or more features by evaluating said predetermined rule;
   determining a process associated with said feature; and
   based on at least said process, generating computer code to manufacture said feature on a computer controlled machine.

2. The method of claim 1 wherein said feature is assigned a feature type by evaluating a second predetermined rule.

3. The method of claim 2 wherein said feature type comprises a plurality of keys, each key comprising a value from a plurality of values, said value selected from said plurality of values by evaluating a third predetermined rule.

4. The method of claim 2 wherein said process is further associated with said feature type using a fourth predetermined rule.

5. The method of claim 1 wherein said features comprises an attribute describing a physical characteristic of said feature.

6. The method of claim 5 wherein said attribute comprises a key and a value.

7. The method of claim 6 further comprising, selecting said value associated with said key using a second predetermined rule.

8. The method of claim 7 wherein said process is further associated with said key and said value using a third predetermined rule.

9. The method of claim 7 further comprising:
   searching a database for a plurality of processes associated with a feature case, said feature case comprising said feature, said key, and said value using a third predetermined rule, selecting said process from said plurality of processes.

10. The method of claim 1 further comprising:
    selecting an attribute associated with said feature using another predetermined rule, said attribute describing a physical characteristic of said feature; and
    wherein said process is further associated with said attribute.

11. A method for manufacturing a part using a computer system, said method comprising:
    receiving a model of said part, said part having a plurality of features;
    selecting a feature of said model from a plurality of features by evaluating a first predetermined rule; and
    associating a process from a plurality of processes with said feature by evaluating a second predetermined rule, wherein said second predetermined rule comprises a fragment of code stored in a computer readable medium.

12. The method of claim 11 wherein said fragment of code evaluates to a true or false value.

13. The method of claim 11 wherein said fragment of code comprises a function that returns a true or false value.

14. The method of claim 11 wherein said fragment of code comprises a logical expression.

15. The method of claim 11 further comprising selecting a process from a plurality of processes corresponding to a feature type associated with said feature, using a third predetermined rule.

16. The method of claim 15 wherein said process comprises at least one process step, said process step comprising a machining parameter used for machining at least a portion of said feature.

17. The method of claim 16 wherein said process step further comprises a machining cycle.

18. The method of claim 17, wherein said process step further comprises a cutting tool parameter to be used by said machining cycle.

19. The method of claim 18, wherein said cutting tool parameter is determined by use of a formula.

20. The method of claim 16, wherein said machining parameter comprises a cost.

21. The method of claim 16, wherein said process step further comprises a machining parameter, said machining parameter having an associated formula for determining a value of said machining parameter.

22. A system for manufacturing a part using a first program stored in a computer readable medium, said system comprising:
    a database comprising a plurality of machining operations and a plurality of rules; and
    a second program stored in memory, said second program operably configured to select a set of machining operations from said plurality of machining operations by evaluating said plurality of rules, said set used to create a portion of said first program.

23. The system of claim 22 wherein said second program accesses said database using an application program interface (API).

24. The system of claim 22 wherein said plurality of rules comprises a code fragment, said code fragment evaluating to a logical value.

25. The system of claim 22 wherein said plurality of rules comprises rules for features, rules for attributes, and rules for processes.

26. The system of claim 25 wherein each feature has one or more attributes.

27. The system of claim 25 wherein each feature has one or more processes.

28. The system of claim 25 wherein an attribute comprises a key and a value, wherein said value has a corresponding rule.

29. A computer system for machining a feature of a part, said computer system comprising a processor, a user input device coupled to said processor, and a display coupled to said processor, said computer system further comprsing:
   a user interface element comprising instructions executed by said processor, said user interface element capable of accepting a comparison expression representing a rule associated with said feature of said part, said comparison expression specified via said user input device and displayed on said display; and
   a database for storing said rule.

30. The computer system of claim 29 wherein said user interface element is further capable of accepting another comparison expression representing another rule associated with an attribute of said feature, said another comparison expression specified via said user input device and displayed on said display, and wherein said another rule is stored in said database and wherein said another comparison expression comprises a function call.

31. A system for manufacturing a part using a computer system comprising:
   a database comprising a plurality of rules and a plurality of machining cycles;
   a CNC program for manufacturing said part on a CNC machine; and
   a generating program stored in a computer readable medium for creating said CNC program, said generating program comprising:
      a rules evaluation module for selecting at least one machining cycle of said plurality of machining cycles by evaluating at least one rule of said plurality of rules; and
      a CNC code generation module for generating a part of said CNC program using said machining cycle.

32. The system of claim 31 wherein said database further comprises parameter formulas for calculating values for machining parameters.

33. The method of claim 1, wherein said plurality of predetermined rules includes a plurality of feature recognition rules that are configured for selecting a feature of said model.

34. The method of claim 33, wherein the feature is selected when said feature recognition rules evaluate to true.

* * * * *

UNITED STATES PATENT AND TRADEMARK OFFICE
CERTIFICATE OF CORRECTION

| | | |
|---|---|---|
| PATENT NO. | : 7,058,472 B2 | Page 1 of 1 |
| APPLICATION NO. | : 11/016187 | |
| DATED | : June 6, 2006 | |
| INVENTOR(S) | : Mathews et al. | |

It is certified that error appears in the above-identified patent and that said Letters Patent is hereby corrected as shown below:

<u>Column 14,</u>

Line 11, "a" should read --the--.

Signed and Sealed this

Fifth Day of December, 2006

JON W. DUDAS
*Director of the United States Patent and Trademark Office*